United States Patent
Espinosa

(10) Patent No.: US 10,018,216 B1
(45) Date of Patent: Jul. 10, 2018

(54) SLOTTED NUT FOR HOLD DOWN THREADED RODS

(71) Applicant: CETRES HOLDINGS, LLC, Jackson, WY (US)

(72) Inventor: Thomas M Espinosa, Snohomish, WA (US)

(73) Assignee: CETRES HOLDINGS, LLC, Jackson, WY (US)

( * ) Notice: Subject to any disclaimer, the term of this patent is extended or adjusted under 35 U.S.C. 154(b) by 77 days.

(21) Appl. No.: 15/167,344

(22) Filed: May 27, 2016

Related U.S. Application Data

(60) Provisional application No. 62/167,737, filed on May 28, 2015, provisional application No. 62/304,659, filed on Mar. 7, 2016.

(51) Int. Cl.
  *F16B 37/16*  (2006.01)
  *F16B 37/08*  (2006.01)

(52) U.S. Cl.
  CPC .......... *F16B 37/0828* (2013.01); *F16B 37/16* (2013.01)

(58) Field of Classification Search
  CPC .............. F16B 37/0828; F16B 37/0842; F16B 37/0857; F16B 37/0878; F16B 37/0892; F16B 37/16
  USPC ................................................ 411/427, 437
  See application file for complete search history.

(56) References Cited

U.S. PATENT DOCUMENTS

| | | | | |
|---|---|---|---|---|
| 633,212 A * | 9/1899 | Paine | ...................... | F16B 37/00 411/427 |
| 1,375,781 A * | 4/1921 | De Long | ............. | F16B 37/0878 269/240 |
| 2,355,679 A * | 8/1944 | Roxs | ................... | F16B 37/0892 411/432 |
| 2,676,509 A * | 4/1954 | Henry | ................ | F16B 37/0807 411/433 |
| 2,942,314 A * | 6/1960 | Debner | ................ | F16B 7/0433 174/146 |
| 3,006,231 A * | 10/1961 | Kahn | ..................... | F16B 5/0291 411/435 |
| 3,878,757 A * | 4/1975 | Puklus, Jr. | ........... | F16B 37/0814 411/433 |
| 4,830,560 A * | 5/1989 | Hirohata | ............. | F16B 37/0864 411/433 |
| 4,861,081 A * | 8/1989 | Satoh | ...................... | E05B 79/12 292/336.3 |

(Continued)

*Primary Examiner* — Roberta S Delisle
(74) *Attorney, Agent, or Firm* — Shlesinger, Arkwright & Garvey LLP

(57) ABSTRACT

A slotted nut has a body with a top surface, a bottom surface and a central axis. The body includes a base portion with first and second corners diagonally disposed from each other, the base portion including a flat surface. First arm portion and second arm portion extend from the first and second corners, respectively. The first and second arm portions are each C-shaped with respective first and second half-circle threaded openings including respective first and second centers disposed on the central axis. The first and second half-circle threaded openings face inwardly toward the central axis. The bottom surface is ramped from a third corner on the bottom surface toward the first arm portion to define a gap between the bottom surface below the first arm portion and a horizontal plane perpendicular to the central axis when the third corner is on the bottom surface.

7 Claims, 6 Drawing Sheets

(56) References Cited

U.S. PATENT DOCUMENTS

| | | | | |
|---|---|---|---|---|
| 5,351,920 A | * | 10/1994 | Decky | F16L 3/13 |
| | | | | 248/222.52 |
| 5,782,597 A | * | 7/1998 | Meyer | F16B 37/0842 |
| | | | | 411/433 |
| 6,631,876 B1 | * | 10/2003 | Phillips | F16B 2/22 |
| | | | | 248/229.16 |
| 6,821,070 B1 | * | 11/2004 | Thompson | F16B 37/0885 |
| | | | | 411/432 |

\* cited by examiner

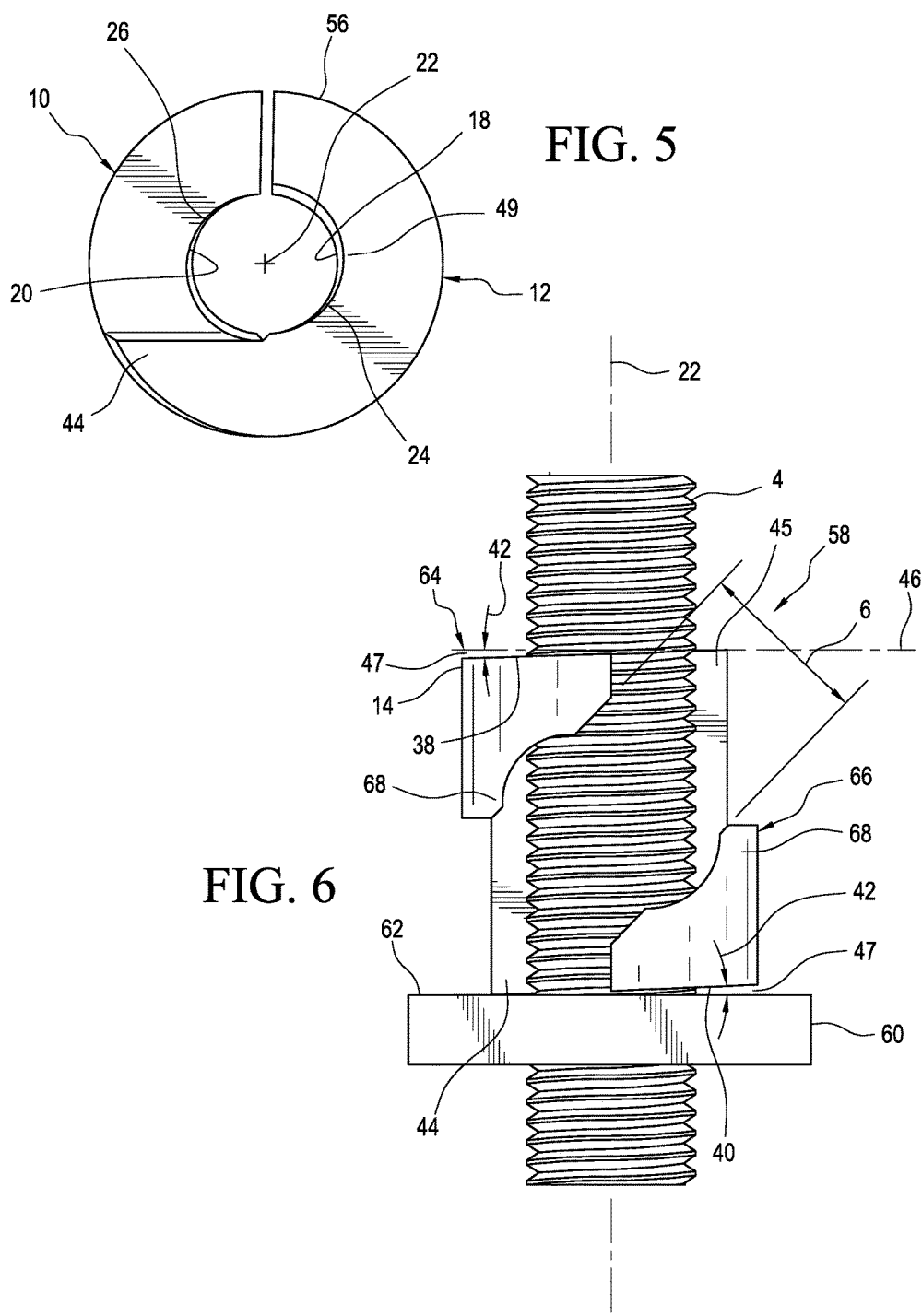

SLOTTED NUT FOR HOLD DOWN THREADED RODS

RELATED APPLICATIONS

This is a nonprovisional application of Provisional Application Ser. Nos. 62/167,737 filed May 28, 2015 and 62/304,659 filed Mar. 7, 2016, both of which are hereby incorporated by reference.

FIELD OF THE INVENTION

The present invention is generally directed to nuts and in particular to slotted nuts that can be attached to or inserted around a threaded rod without first gaining access to one end of the threaded rod.

SUMMARY OF THE INVENTION

The present invention provides a slotted nut, comprising a body including a top surface and a bottom surface and a central axis. The body includes a base portion with first and second corners diagonally disposed from each other, the base portion including a flat surface. First arm portion and second arm portion extend from the first and second corners, respectively. The first arm portion is C-shaped with a first half-circle threaded opening including a first center on the central axis. The second arm portion is C-shaped with a second half-circle threaded opening including a second center disposed on the central axis. The first and second half-circle threaded openings face inwardly toward the central axis. The bottom surface is ramped from a third corner on said bottom surface toward said first arm portion to define a gap between said bottom surface below said first arm portion and a horizontal plane perpendicular to said central axis when said third corner is on said bottom surface.

BRIEF DESCRIPTION OF THE DRAWINGS

FIG. 5 is a bottom view of the slotted nut shown in FIG. 4.

FIG. 6 is a side elevational view of another embodiment of a slotted nut made in accordance with the present invention, shown attached to a threaded rod.

DETAILED DESCRIPTION OF THE INVENTION

Figure 1:
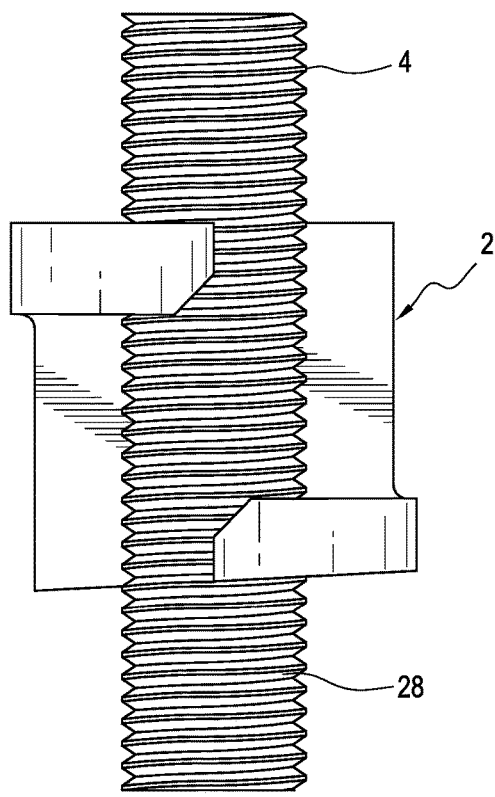
FIG. 1 is a side elevational view of a slotted nut made in accordance with the present invention, shown attached to a threaded rod.

A slotted nut 2 attached to a threaded rod 4 is disclosed in FIG. 1. The slotted nut 2 can be threaded to any part of the rod 4, without requiring access to the end of the rod 4, as with a regular nut. The slotted nut 2 is advantageously useful in the installation of a hold down system comprising the rod 4, for example as disclosed in U.S. Pat. No. 8,136,318, herein incorporated by reference, wherein a nut securing the rod against bottom plate of a stud wall or a bearing plate on the bottom plate may be installed even after the threaded rod has already been installed through the walls above.

Figure 2:
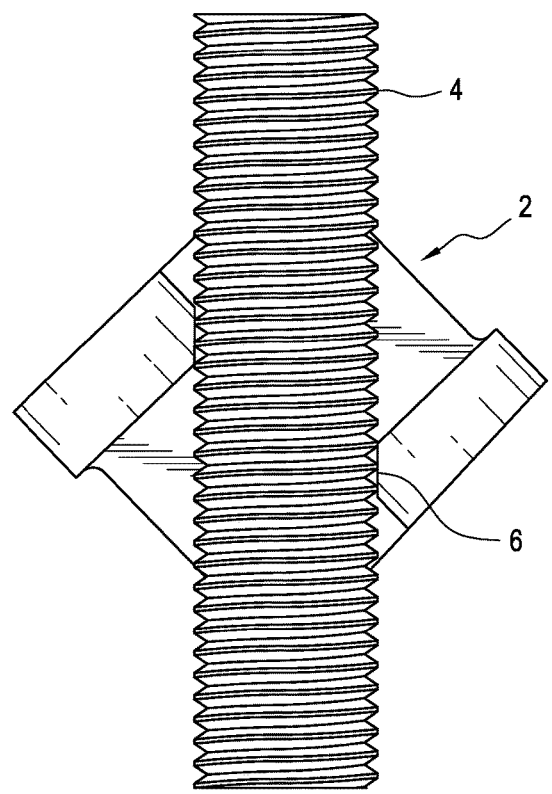
FIG. 2 is a side elevational view of the slotted nut of FIG. 1, shown being inserted around the threaded rod in the process of being installed.

Referring to FIG. 2, the nut 2 is inserted around the rod 4 through an opening 6 and then turned clockwise to the position shown in FIG. 1 to engage the inner threads of the nut 2 with the threads of the rod 4.

Figure 3:
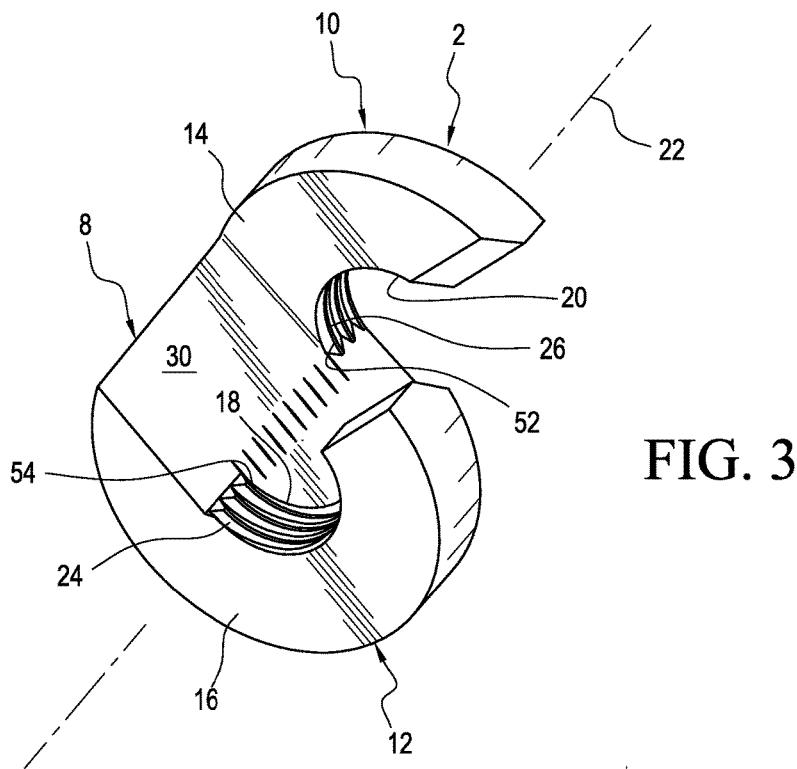
FIG. 3 is a bottom perspective view of the slotted nut of FIG. 1.
Figure 4:
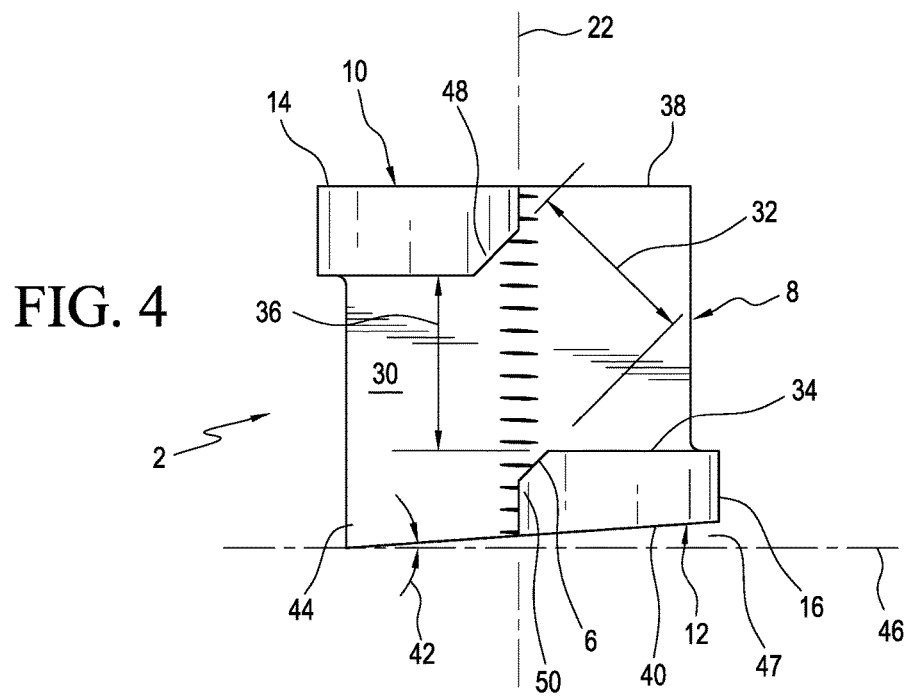
FIG. 4 is front elevational view of the slotted nut shown in FIG. 3.

Referring to FIGS. 3 and 4, the nut 2 includes a base portion 8 and arm portions 10 and 12 disposed at diagonally opposed corners 14 and 16 of the base portion 8. Each of the arm portions 10 and 12 is C-shaped with half-circular openings 18 and 20 that face each other that form a circle about a central axis 22. The openings 18 and 20 include threads 24 and 26 configured to mate with the threads 28 of the rod 4.

Referring to FIG. 4, the base portion 8 includes a flat or planar surface 30 tangential to the openings 18 and 20. The surface 30 guides the nut 2 into engagement with the threads 28 of the rod 4 when the nut 2 is rotated from the position shown in FIG. 2 to the position shown in FIG. 1. The flat area 30 advantageously provides room to maneuver the nut 2 into engagement with the threads 28 of the rod 4. The opening 6 is defined by a distance 32 configured to receive the rod 4 and engage the surface 30. Another opening 34 defined by a distance 36 may also be used to insert the nut 2 around the rod 4. The distance 36 is configured to receive the rod 4 and engage the surface 30.

Referring to FIG. 4, the nut 2 includes a top surface 38 and a bottom surface 40. The top surface is preferably perpendicular with the central axis 22. The bottom surface 40 rises or ramps at a small angle 42 from a horizontal plane 46 from a corner 44 opposite from the corner 16. An angled gap 47 is thus formed between the arm portion 12 and the horizontal surface 46. The horizontal plane 46 is perpendicular to the central axis 22. When the nut 2 is tightened against a horizontal surface (represented by the horizontal plane 46), the corner 44 will engage the surface 46 and acts as a fulcrum, producing a reaction force tending to rotate the nut 2 clockwise, thereby forcing the threads 24 and 26 into tight engagement against the threads 28 of the rod 4. The arm portion 12 will tend to move downwardly into the gap 47 while at the same time both the arm portions 12 and 10 will move inwardly toward the rod 4. The corner 44 provides maximum distance to the 3 O'clock position 49 (see FIG. 5) of the threads 24 for maximum leverage when the nut 2 is tightened against the surface 46.

The corners 48 and 50 of the arm portions 10 and 12, respectively, are cut, preferably at 45° relative to the central axis 22 to advantageously facilitate the engagement of the threads 24 and 26 of the arm portions 12 and 10 with the threads 28 of the rod 4. The thread portions 52 and 54 on the surface 30 are also cut at the same angle. As the nut 2 is rotated from the insertion position shown in FIG. 2 to the operative position shown in FIG. 1, lesser number of threads is presented at the start of the rotation, thereby facilitating the positioning of the nut 2 around the rod 4.

Referring to FIG. 5, a bottom view of the nut 2 is shown, with the central axis 22 being perpendicular to the plane of the paper. The half-circular openings 18 and 20 are shown making a full circle. The half-circular openings 18 and 20 are complementary to each other. The corner 44 is advantageously at maximum distance to the 3 o'clock position 49 of the threads.

The nut 2 may be seen as a cylindrical body with a central threaded opening, with portions cut away to allow insertion of the nut 2 as shown in FIG. 2 and then rotation of the nut 2 to the position as shown in FIG. 1.

Figure 9:
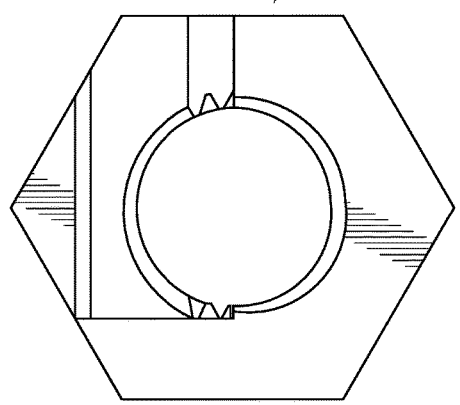
FIG. 9 is a bottom view of the slotted nut with hexagonal outer shape.

The outside surface 56 of the nut 2 may be provided with hexagonal flat surfaces to facilitate tightening of the nut 2 with a standard wrench (see FIG. 9). While the nut 2 is shown with a cylindrical outer surface 56, the nut 2 may also have other outer surfaces, such as spherical (see FIG. 12).

Figures 10, 11:
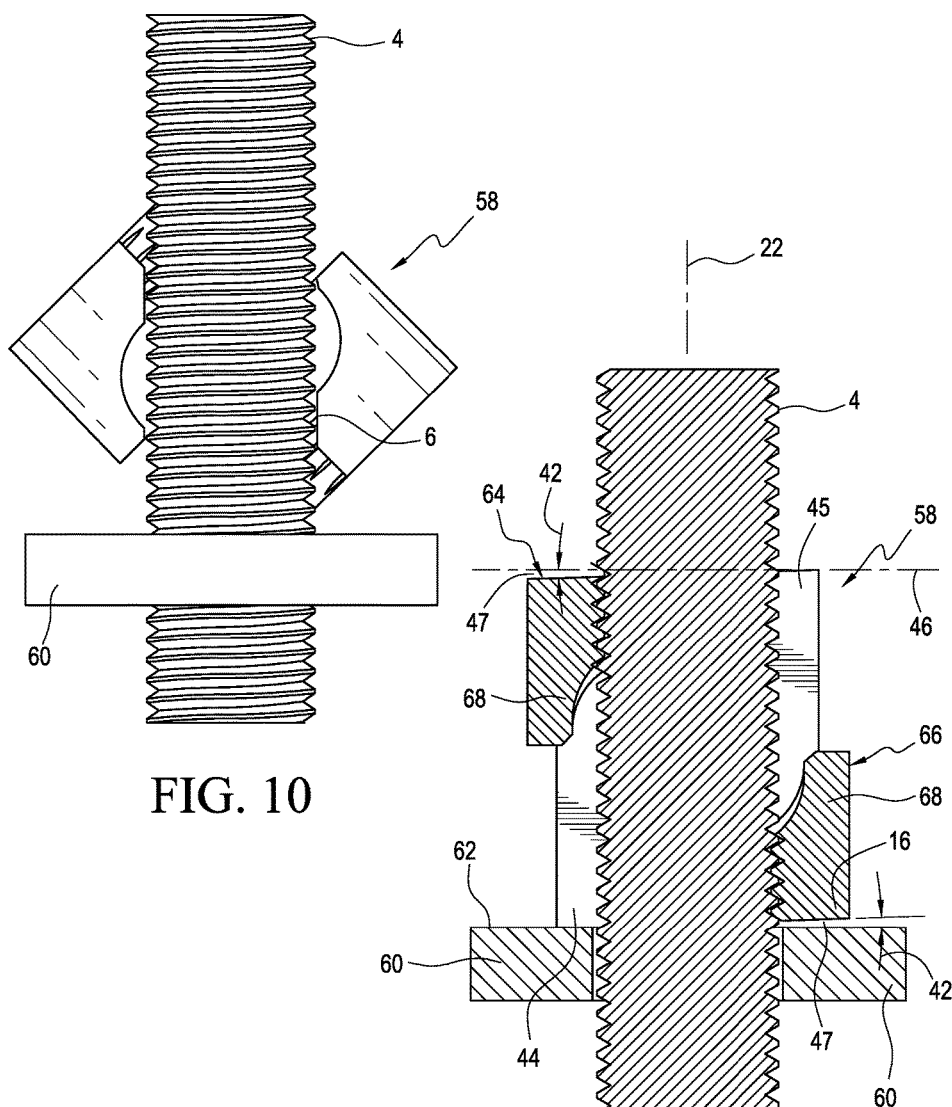
FIG. 10 is a side elevational view of the slotted nut of FIG. 6, shown being inserted around the threaded rod in the process of being installed.
FIG. 11 is a cross-sectional view of FIG. 6.

Referring to FIGS. 6 and 11, another embodiment of a slotted nut 58 is disclosed. The slotted nut 58 is shown threaded to the threaded rod 4 and pressing on a bearing plate 60. As with the slotted nut 2, the slotted nut 58 has a bottom surface 40 that makes an angle 42 with the top surface 62 of the bearing plate 60, providing an angled gap 47. The top surface 38 descends or ramps down at the small angle 42 from a horizontal plane 46, which is parallel to the top surface 62 of the bearing plate 60, from a corner 45 opposite from the corner 14. An angled gap 47 is thus formed between the arm portion 64 and the horizontal plane 46. The top surface 38 is angled with respect to the top surface 62 of the bearing plate and preferably parallel to the bottom surface 40. Accordingly, the slotted nut 58 can be installed with either the surface 40 or the surface 64 being next to the bearing plate 60.

Figure 7:
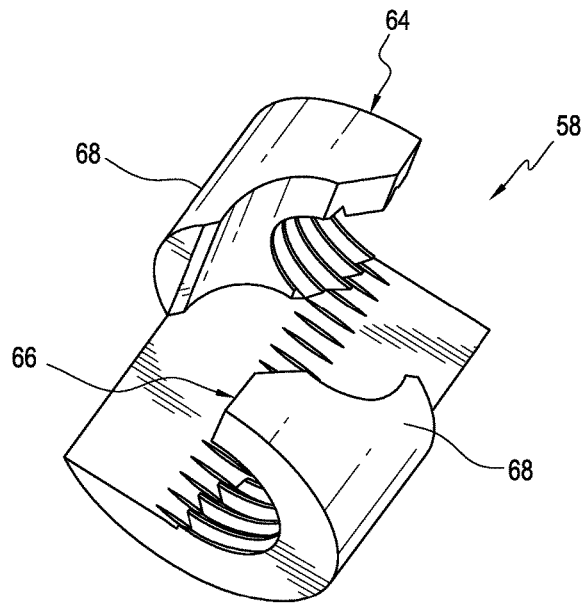
FIG. 7 is a bottom perspective view of the slotted nut of FIG. 6.

Referring to FIG. 7, the slotted nut 58 includes arm portions 64 and 66 that are substantially triangular in front view with portions 68 extending axially inwardly in opposite directions. The portions 68 advantageously provide greater rigidity to the arm portions 64 and 66.

Figure 8:
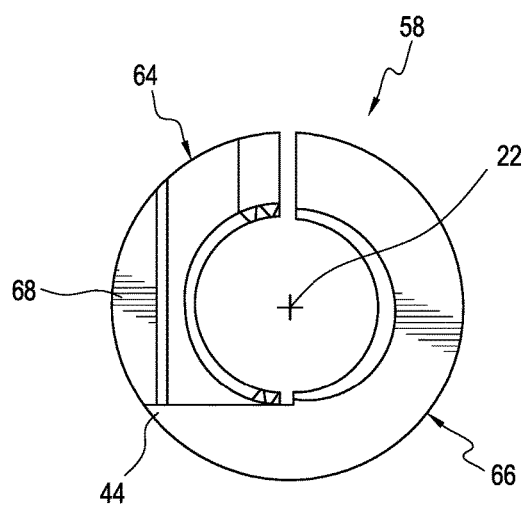
FIG. 8 is a bottom view of the slotted nut shown in FIG. 7.

Referring to FIG. 8, a bottom view of the nut 58 is shown, with the central axis 22 being perpendicular to the plane of the paper.

FIG. 9 is a bottom view of the nut 58 with hexagonal outer shape.

Referring to FIG. 10, the nut 58 is inserted around the rod 4 in the same manner as the nut 2, through an opening 6 and then turned clockwise to the position shown in FIG. 6 to engage the inner threads of the nut 58 with the threads of the rod 4.

Figure 12:
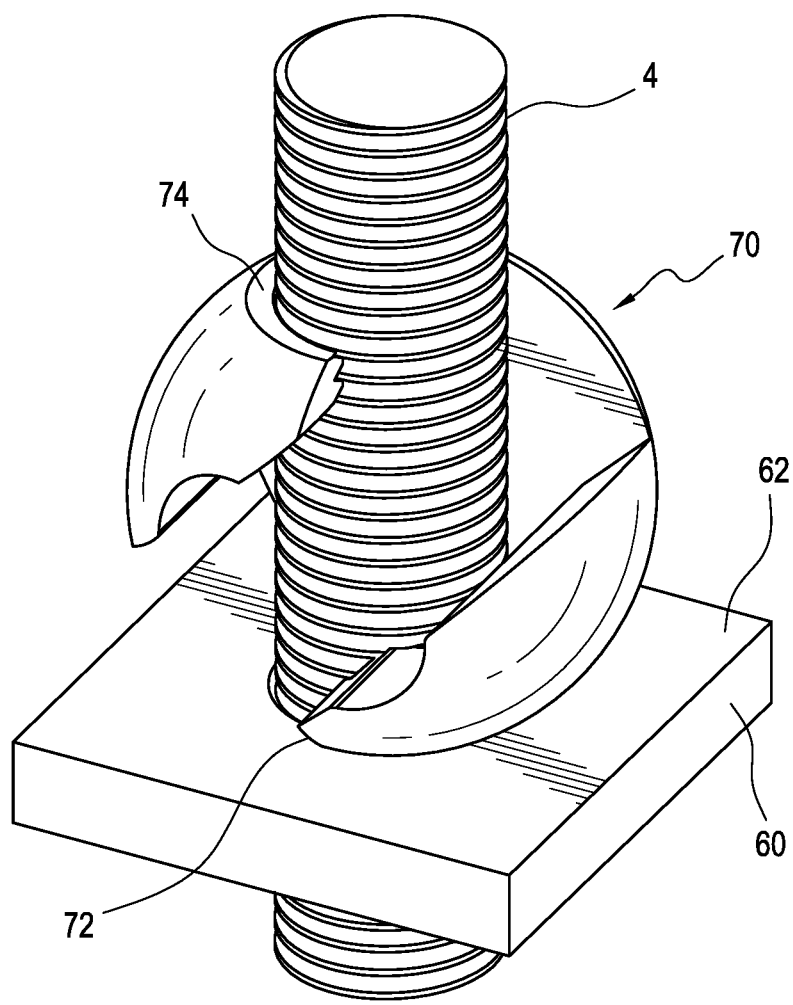
FIG. 12 is a perspective view of another embodiment of the slotted nut with a spherical outer shape.

Referring to FIG. 12, another embodiment of a slotted nut 70 with a spherical outer shape is disclosed. The slotted nut 70 works the same way as the slotted nut 2 with its bottom edge 72 being angled. The slotted nut 70 may also be provided with a top edge 74 being angled with respect to the top surface 62 of the bearing plate 60 in the same way as the slotted nut 58.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A slotted nut, comprising:
   a) a body including a top surface and a bottom surface, said body including a central axis;
   b) said body including a base portion with first and second corners diagonally disposed from each other, said base portion including a flat surface;
   c) first arm portion and second arm portion extending from said first and second corners, respectively;
   d) said first arm portion is C-shaped with a first half-circle threaded opening including a first center on said central axis;
   e) said second arm portion is C-shaped with a second half-circle threaded opening including a second center disposed on said central axis;
   f) said first and second half-circle openings facing inwardly toward said central axis; and
   g) said bottom surface is ramped from a third corner on said bottom surface toward said first arm portion to define a gap between said bottom surface below said first arm portion and a horizontal plane perpendicular to said central axis when said third corner is on said horizontal plane.

2. A slotted nut as in claim 1, wherein said first and second arm portions each includes a portion extending axially in opposite directions from said respective first and second corners.

3. A slotted nut as in claim 2, wherein said first and second arm portions are substantially triangular in elevational view.

4. A slotted nut as in claim 1, wherein said top surface is ramped from a fourth corner on said top surface toward said second arm portion to define a gap between said top surface above said second arm portion and a horizontal plane perpendicular to said central axis.

5. A slotted nut as in claim 1, wherein said body includes a hexagonal cross-section.

6. A slotted nut as in claim 1, wherein said body is cylindrical.

7. A slotted nut as in claim 1, wherein said body is spherical.

\* \* \* \* \*